(12) United States Patent
Kwon et al.

(10) Patent No.: US 9,927,869 B2
(45) Date of Patent: Mar. 27, 2018

(54) APPARATUS FOR OUTPUTTING VIRTUAL KEYBOARD AND METHOD OF CONTROLLING THE SAME

(71) Applicant: Center of Human-Centered Interaction For Coexistence, Seoul (KR)

(72) Inventors: Joung Huem Kwon, Seoul (KR); Yongho Lee, Seoul (KR); Bum Jae You, Seoul (KR)

(73) Assignee: Center Of Human-Centered Interaction for Coexistence, Seoul (KR)

( * ) Notice: Subject to any disclaimer, the term of this patent is extended or adjusted under 35 U.S.C. 154(b) by 0 days.

(21) Appl. No.: 15/620,170

(22) Filed: Jun. 12, 2017

(65) Prior Publication Data

US 2017/0371405 A1   Dec. 28, 2017

(30) Foreign Application Priority Data

Jun. 19, 2017   (KR) .................. 10-2016-0080867

(51) Int. Cl.
*G06F 3/01* (2006.01)
*G06T 19/00* (2011.01)
*G06T 15/40* (2011.01)
*G06T 19/20* (2011.01)
*G06F 3/16* (2006.01)

(52) U.S. Cl.
CPC .............. *G06F 3/011* (2013.01); *G06T 15/40* (2013.01); *G06T 19/006* (2013.01); *G06T 19/20* (2013.01); *G06F 3/014* (2013.01); *G06F 3/016* (2013.01); *G06F 3/167* (2013.01); *G06T 2215/16* (2013.01); *G06T 2219/2004* (2013.01); *G06T 2219/2012* (2013.01); *G06T 2219/2016* (2013.01)

(58) Field of Classification Search
None
See application file for complete search history.

(56) References Cited

FOREIGN PATENT DOCUMENTS

KR   1020150099430 A   8/2015
KR   1020160011451 A   2/2016

*Primary Examiner* — Michelle Chin
(74) *Attorney, Agent, or Firm* — Medelsohn Dunleavy, P.C.

(57) ABSTRACT

Disclosed is an apparatus for outputting a virtual keyboard, the apparatus including: a virtual keyboard image output unit determining coordinates of a virtual keyboard image by using hand information of a user and outputting the virtual keyboard image; a contact recognition unit determining a contact state by using collision information between a virtual physical collider associated with an end point of a user's finger and a virtual physical collider associated with each virtual key of the virtual keyboard image; a keyboard input unit providing multiple input values for a single virtual key; and a feedback output unit outputting respective feedback for the multiple input values. Accordingly, input convenience and efficiency may be provided by outputting the virtual keyboard in a three dimensional virtual space and reproducing an input method using a keyboard form that is similar to the real world.

6 Claims, 5 Drawing Sheets

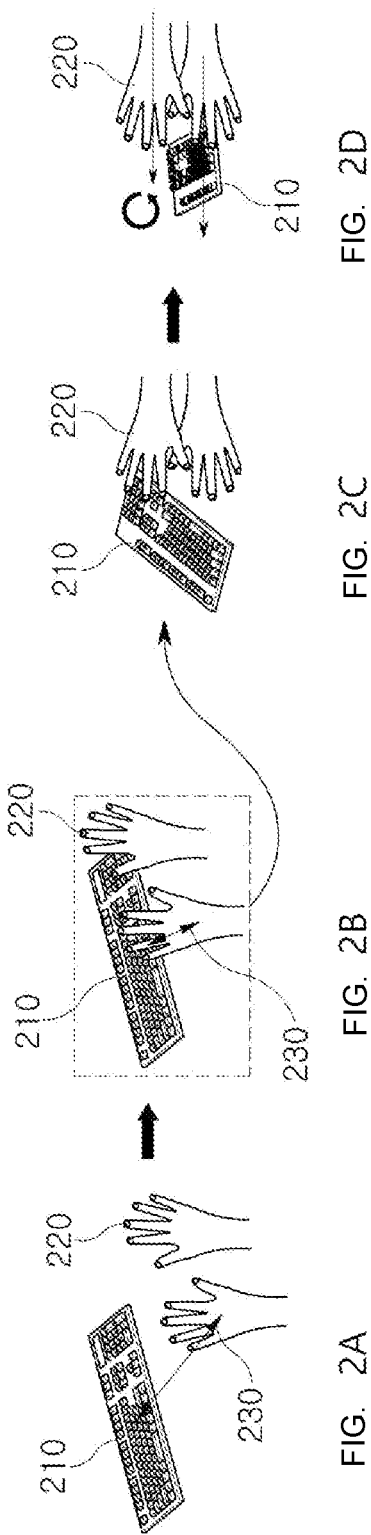

APPARATUS FOR OUTPUTTING VIRTUAL KEYBOARD AND METHOD OF CONTROLLING THE SAME

CROSS REFERENCE TO RELATED APPLICATION

The present application claims priority to Korean Patent Application No. 10-2016-0080867, filed Jun. 28, 2016, the entire contents of which is incorporated herein for all purposes by this reference.

BACKGROUND OF THE INVENTION

Field of the Invention

Embodiments of the present invention generally relate to an apparatus for outputting a virtual keyboard and a method of controlling the same.

Description of the Related Art

Recently, the need for information input devices for immersive virtual environment systems has increased due to developments in head mounted display devices for implementing virtual reality and augmented reality, and to demand increases in contents related to the same.

For example, a joystick and a wand that a user can hold and manipulate, or input devices based on gestures through finger motions, etc. have been actively studied and developed as means for efficiently inputting data in a virtual reality environment.

However, the user may feel inconvenience since he or she has to separately learn how to use those input devices and usage methods thereof are different from a keyboard input method using the user's hands that is used as a conventional computer input method.

Studies utilizing user's hand gestures by using various sensors and using them for key inputs have been developed due to the above inconvenience. However, since there is no physical contact in a three dimensional space, input errors frequently occur due to recognition limit by only using spatial depth information provided to the user.

For example, although the user feels that he or she has input a specific virtual key of a virtual keyboard image, a key input of the specific virtual key may not be performed when coordinates of a finger's end point of the user are not placed within a boundary area of the specific key of a system.

Korean Patent Application Publication No. 10-2016-0011451 discloses an apparatus for inputting a character by using a virtual keyboard and hand gestures and a method of inputting a character using the same, the apparatus and the method provide a character input interface by using a result of recognizing changes in three dimensional coordinate values of an end point of a user's finger and by using a result obtained by matching the three dimensional coordinate values of the end point of the user's finger and coordinate values of a virtual keyboard having arbitrary coordinate values. However, the apparatus and the method do not disclose any solutions for the above problem.

The foregoing is intended merely to aid in the understanding of the background of the present invention, and is not intended to mean that the present invention falls within the purview of the related art that is already known to those skilled in the art.

SUMMARY OF THE INVENTION

An object of the present invention is to provide an apparatus for outputting a virtual keyboard and a method of controlling the same whereby input convenience and efficiency can be provided by outputting a virtual keyboard in a three dimensional virtual space and reproducing an input method using a keyboard form that is similar to the real world.

In addition, another object of the present invention is to provide an apparatus for outputting a virtual keyboard and a method of controlling the same that are convenient to a user by rotating a virtual keyboard image through hand information received from a sensor and performing a rendering process for an overlapping image process whereby a user's hand image is always displayed above the virtual keyboard image.

In addition, another object of the present invention is to provide an apparatus for outputting a virtual keyboard and a method of controlling the same in which a contact recognition error is reduced by determining a key contact through a physical engine wherein virtual physical colliders are applied to an end point of a user's finger and to each virtual key of the virtual keyboard image, respectively, and by applying a back-touch prevention algorithm and a de-bouncing algorithm to the virtual keyboard.

In addition, another object of the present invention is to provide an apparatus for outputting a virtual keyboard and a method of controlling the same in which different input values are input by inputting a single virtual key and without simultaneously inputting two virtual keys by assigning multiple input values for each virtual key of the virtual keyboard image and providing different input values according to a collision state flag and a contact time.

In addition, another object of the present invention is to provide an apparatus for outputting a virtual keyboard and a method of controlling the same in which a virtual key input recognition rate is also increased by differently outputting visual feedback, auditory feedback, and tactile feedback for each key value input.

Objects of the present invention are not limited to the above described objects, and those skilled in the art will clearly understand other unmentioned objects from the following description.

In one aspect of the present disclosure, there is provided an apparatus for outputting a virtual keyboard, the apparatus including: a virtual keyboard image output unit determining coordinates of a virtual keyboard image by using hand information of a user received from a sensor and outputting the virtual keyboard image by performing an image processing process; a contact recognition unit recognizing a contact state by using collision information between a virtual physical collider associated with an end point of a user's finger and a virtual physical collider associated with each virtual key of the virtual keyboard image output from the virtual keyboard image output unit; a keyboard input unit providing multiple input values for a single virtual key according to contact recognition information generated by the contact recognition unit; and a feedback output unit outputting respective feedback for the multiple input values provided by the contact recognition unit and the keyboard input unit, wherein the virtual keyboard image output unit: deduces a three-dimension positional relationship between the user and the virtual keyboard image by using user's finger information received from the sensor; determines that a user intends to use a virtual keyboard within a system when a distance between a center point of a user's palm and a center point of the virtual keyboard image is equal to or less than a predetermined distance; calculates a normal vector of the user's palm and rotates and outputs the virtual keyboard image by using the calculated normal vector to make the virtual keyboard image parallel to the user's palm; and when a user's hand image and the virtual keyboard image overlap, performs a depth rendering process on an occlusion to erase the virtual keyboard image according to a shape of a user's hand and to preferentially output the user's hand image, thereby the virtual keyboard image is always placed under the user's hand.

In one embodiment, the contact recognition unit may apply the virtual physical colliders to an end point of the user's hand and to each virtual key of the virtual keyboard image output from the virtual keyboard image output unit, respectively, and determines a virtual keyboard input state by representing the contact state between the user's hand image and the virtual keyboard image in a collision state flag, in an inner passing state flag, and in a separation state flag by using the virtual physical colliders.

In one embodiment, when the virtual physical collider of the end point of the user's hand collides with the virtual physical collider of the virtual key, the contact recognition unit may calculate a finger position and a directional vector thereof at which the end point of the user's hand collides with the virtual physical collider, and generate the collision state flag only when the user's finger passes only a front surface of a physical model of the virtual physical collider of the virtual key.

In one embodiment, the contact recognition unit may calculate a key input interval for each virtual key in real time by using contact time of the virtual key of the virtual keyboard image, and when multiple key inputs are input within a predetermined time period for the same virtual key, the contact recognition unit does not generate the collision state flag.

In one embodiment, the keyboard input unit may provide a basic input value of a corresponding virtual key when the flag generated by the contact recognition unit is the collision state flag, or determine that the user has deeply input the virtual key and provides another input value of the corresponding virtual key that is preset when the flag generated by the contact recognition unit is the inner passing state flag and an inner passing duration time is maintained for a predetermined time period.

In one embodiment, the feedback output unit may respectively output different feedback for the multiple input values of the virtual key provided by the contact recognition unit and the keyboard input unit, and provides proper information for a virtual keyboard input by implementing a color change or an animation effect when the information is visual feedback, by implementing a virtual key input sound when the information is auditory feedback, and by adjusting a vibration strength of a device when the information is tactile feedback, the device including a vibrator, having a ring shape or a thimble shape, and being worn on an end part of the user's hand.

Specific items of other exemplary embodiments are included in the detailed description and the drawings.

Merits and characteristics of the present invention, and methods for accomplishing them will become more apparent from the following embodiments taken in conjunction with the accompanying drawings. However, the present invention is not limited to the disclosed embodiments, but may be implemented in various manners. The embodiments are provided to complete the disclosure of the present invention and to allow those having ordinary skill in the art to understand the scope of the present invention. The present invention is defined by the category of the claims. The same reference numbers will be used throughout the drawings to refer to the same or like parts.

According to the present invention, input convenience and efficiency may be provided by outputting the virtual keyboard in a three dimensional virtual space and reproducing an input method using a keyboard form that is similar to the real world.

In addition, according to the present invention, there may be an effect of providing a convenient virtual keyboard environment to the user by rotating the virtual keyboard image through hand information received from the sensor and performing a rendering process for an overlapping image process whereby the user's hand image is always displayed above the virtual keyboard image.

In addition, according to the present invention, a contact recognition error may be reduced by determining a specific key contact through a physical engine wherein virtual physical colliders are applied to an end point of a user's finger and to each virtual key of the virtual keyboard image, respectively, and by applying a back-touch prevention algorithm and a de-bouncing algorithm to the virtual keyboard.

In addition, according to the present invention, different values may be input by inputting a single virtual key without simultaneously inputting two virtual keys by assigning multiple input values for each virtual key of the virtual keyboard image and providing different input values according to a collision state flag and contact time.

In addition, according to the present invention, a virtual key input recognition rate may be also increased by differently outputting visual feedback, auditory feedback, and tactile feedback for each key value input.

BRIEF DESCRIPTION OF THE DRAWINGS

The above and other objects, features and other advantages of the present invention will be more clearly understood from the following detailed description when taken in conjunction with the accompanying drawings, in which:

FIGS. 2A, 2B, 2C and 2D are reference views showing a rotation process of a virtual keyboard image executed in the apparatus for outputting the virtual keyboard according to the embodiment of the present invention;

FIGS. 3A, 3B and 3C are reference views showing an outputting process of the virtual keyboard image executed in the apparatus for outputting the virtual keyboard according to the embodiment of the present invention;

DETAILED DESCRIPTION OF THE INVENTION

Hereinbelow, exemplary embodiments of the present invention will be described in detail with reference to the accompanying drawings.

Figure 1:
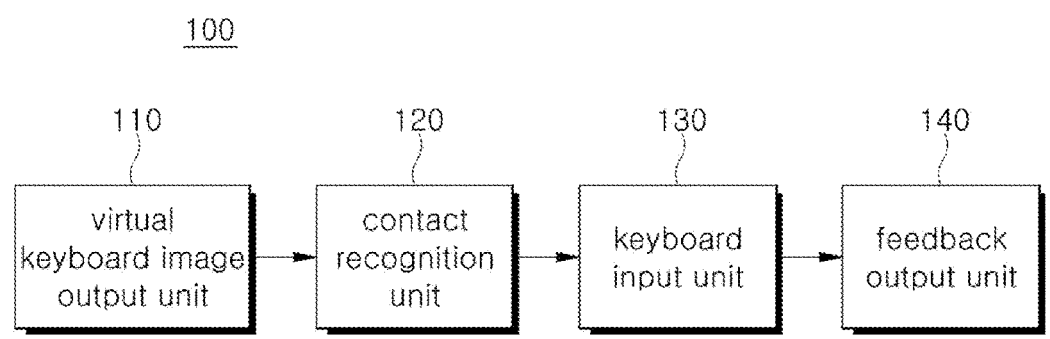
FIG. 1 is a block diagram showing an internal structure of an apparatus for outputting a virtual keyboard according to an embodiment of the present invention.

FIG. 1 is a block diagram showing an internal structure of an apparatus for outputting a virtual keyboard according to an embodiment of the present invention.

Referring to FIG. 1, the apparatus for outputting the virtual keyboard 100 according to the embodiment of the present invention includes: a virtual keyboard image output unit 110, a contact recognition unit 120, a keyboard input unit 130, and a feedback output unit 140.

The virtual keyboard image output unit 110 outputs a virtual keyboard image in a virtual reality environment at a calculated position such that a user may conveniently use a virtual keyboard.

For this, the virtual keyboard image output unit 110 uses hand information received from a sensor and provides coordinate information of a user's finger to the virtual keyboard image output unit 110. Herein, the sensor sensing the hand information is implemented by a detection sensor or a body/hand motion capture device that is provided in a front part of a head mounted display device.

The virtual keyboard image output unit 110 fixes the virtual keyboard image at a fixed position in an initial state, determines whether or not the user intends to use the virtual keyboard, and rotates and outputs the virtual keyboard image thereby a user's palm and the virtual keyboard image are in parallel. For this, the virtual keyboard image output unit 110 determines whether or not the user intends to use the virtual keyboard by using a distance between a center point of the user's palm and a center point of the virtual keyboard image.

In one embodiment, when the distance between the center point of the user's palm and the center point of the virtual keyboard image is equal to or greater than a predetermined distance, the virtual keyboard image output unit 110 determines that the use does not intend to use the virtual keyboard and does not perform any action.

In another embodiment, when the distance between the center point of the user's palm and the center point of the virtual keyboard image is equal to or less than the predetermined distance, the virtual keyboard image output unit 110 determines that the user intends to use the virtual keyboard, and rotates and outputs the virtual keyboard image whereby the user's palm and the virtual keyboard image are in parallel.

In the above embodiment, the virtual keyboard image output unit 110 outputs the virtual keyboard image by using a normal vector of the user's palm through detecting a hand direction in order to output the virtual keyboard image to be parallel to the user's palm. The virtual keyboard image output unit 110 outputs the virtual keyboard image to be placed under a user's hand when the virtual keyboard image and the user's hand overlap while outputting the virtual keyboard image in the virtual reality environment.

For this, the virtual keyboard image output unit 110 respectively performs rendering on the virtual keyboard image and on a user's hand image, and outputs a final virtual keyboard image by performing an image overlapping process.

In one embodiment, the virtual keyboard image output unit 110 primarily compares rendering positions of the virtual keyboard image and the user's hand image, and outputs the virtual keyboard image except for the overlapped area.

In another embodiment, the virtual keyboard image output unit 110 may perform an occlusion rendering process on a part in which the user's hand image and the virtual keyboard image overlap, erase the virtual keyboard image and output the user's hand image, thus the user's hand may always be placed above the virtual keyboard image.

The contact recognition unit 120 recognizes a contact by determining whether or not a virtual physical collider associated with an end point of the user's finger has collided with a virtual physical collider associated with each virtual key of the virtual keyboard image that is output from the virtual keyboard image output unit 110. The virtual physical collider associated with the end point of the user's finger may be implemented in a sphere form and the virtual physical collider associated with each virtual key of the virtual keyboard image may be implemented in a shape having a specific form (for example, cube, etc.).

In detail, before outputting the virtual keyboard image by rendering thereof, the present invention constitutes a physical engine in which the virtual physical collier is provided at a position associated with each virtual key of the virtual keyboard image. Then, the present invention renders the virtual keyboard image to be associated with the physical engine. Accordingly, when the user's finger presses each virtual key of the virtual keyboard image, the virtual physical collider associated with the end point of the user's finger collides with the virtual physical collider associated with each virtual key of the virtual keyboard.

Conventionally, whether or not a specific virtual key is input is checked by checking whether or not tracking coordinates of a finger's end point received from a hand motion sensor are within a boundary area of one key among virtual keys of a virtual keyboard image. However, in the conventional method, since there is no physical contact in a three dimensional space, there is recognition limit of a virtual key input by using only spatial depth information provided to a user. Thus, key input errors frequently occur.

For example, although the user has input a specific virtual key of the virtual keyboard image, a key input of the specific virtual key may not be determined as a contact, and the key input thereof may not be performed when coordinates of a finger's end point of the user is not placed within a boundary area of the specific key of a system.

However, the present invention solves the conventional problem by respectively applying different virtual physical colliders to each virtual key of the virtual keyboard image and determining that an end part of the user's finger has contacted a specific virtual key of the virtual keyboard image when the virtual physical collider of the end point of the user's finger collides with the virtual physical collider associated with the specific virtual key.

The contact recognition unit 120 generates a collision state flag when the virtual physical collider of the end point of the user's finger collides with the virtual physical collider associated with a specific key, generates an inner passing state flag when the virtual physical collider of the user's finger is placed inside the virtual physical collider associated with the specific key, and generates a separation state flag when the virtual physical collider of the end point of the user's finger moves out from the virtual physical collider associated with the specific key.

When the contact recognition unit 120 generates the inner passing state flag as described above, the contact recognition unit 120 also measures an inner passing duration time. By using the inner passing state flag and the inner passing duration time that are generated by the contact recognition unit 120, the keyboard input unit 130 may only provide another key input value when the inner passing duration time is equal to or greater than a predetermined time when providing a key input value. The detailed description thereof will be described later while describing the keyboard input unit 130.

When the contact recognition unit 120 generates the collision state flag according to whether or not the collision (input) is simply made while generating the collision state flag as described above, a right collision (input) state flag may be generated when the user's hand forwardly moves from a front part of the virtual keyboard image. However, when the user's hand backwardly moves from a rear part of the virtual keyboard image, a wrong collision (input) state flag may be generated, and this causes a back-touch error.

In other words, since there is no rigid body (actual computer keyboard) in the virtual reality environment, it may be recognized as a contact by passing through the virtual key and backwardly passing the virtual key when the user's finger enters little deeper while inputting the virtual key.

In one embodiment, the contact recognition unit 120 may determine as a normal contact recognition when the directional vector is identical to an input direction that is from a front surface to a rear surface of the virtual keyboard image by calculating in real time a directional vector of an end point of the user's hand that is moving. Alternatively, the contact recognition unit 120 may determine as an abnormal contact recognition when the directional vector is opposite to the input direction, in other words, from the rear surface to the front surface of the virtual keyboard image, and the contact recognition unit 120 may not generate the collision state flag and may not perform an input process. Contact recognition errors of the virtual keyboard may be reduced by using a back-touch preventing algorithm.

When the contact recognition unit 120 generates the collision state (input) flag for all contacts without considering a user's intention while generating the contact state flag as described above, errors of generating collision state (input) flags that are not intended by the user may occur.

For example, when the hand information received from the sensor is inaccurate due to some reasons such as hand trembling, a collision state (input) flag that is different from that of a virtual key that the user intends to input may be generated, or a number of collision state (input) flags that is different from that of a user intention may be generated.

In one embodiment, the contact recognition unit 120 measures contact time of each virtual key of the virtual keyboard image, calculates an interval between virtual key inputs in real time, and when multiple virtual key inputs are input within a very short time period in milliseconds (ms) for the same virtual key, the contact recognition unit 120 determines that the inputs are unintended, does not generate the collision state (input) flag, and does not perform an input process.

In another embodiment, the contact recognition unit 120 may measure contact time of each virtual key of the virtual keyboard image, perform a method of preventing the same key inputs and distinguish virtual key inputs of different virtual keys at the same time, thereby the virtual key input of the virtual keyboard image may be smoothly performed. Contact recognition errors of the virtual keyboard image may be reduced by using a de-bounding algorithm.

The keyboard input unit 130 provides a key value of a corresponding virtual key according to a flag type generated by the contact recognition unit 120.

In one embodiment, when the generated flag type is a contact state flag of a specific virtual key of the virtual keyboard image, the keyboard input unit 130 provides a corresponding key value of the specific virtual key.

In another embodiment, when the generated flag type is an inner passing state flag of the specific virtual key of the virtual keyboard image, the keyboard input unit 130 provides another key value of the specific virtual key according to an inner passing duration time.

The above process is performed to check whether or not the user's finger has passed the virtual physical collider associated with the specific virtual key to input another key value of the specific virtual key that is provided according to an inner passing duration time or to check whether or not the user's finger has contacted the virtual physical collider associated with the specific virtual key due to a spatial depth recognition error.

In other words, when the flag type generated by the contact recognition unit 120 is an inner passing state flag of a specific virtual key and an inner passing duration time is equal to or greater than a predetermined time, the keyboard input unit 130 determines that the user's finger intends to input another key value of the specific virtual key and provides the another key value of the specific virtual key.

However, when the flag type generated by the contact recognition unit 120 is an inner passing state flag of a specific virtual key and an inner passing duration time is equal to or less than a predetermined time, the contact recognition unit 120 determines that the user's finger has contacted the virtual physical collider associated with the specific virtual key due to the spatial depth recognition error and does not perform any action.

As the embodiment described above, the keyboard input unit 130 provides different key values of the specific virtual key according to the inner passing duration time when the flag type generated by the contact recognition unit 120 is the inner passing state of the specific key since the user has difficulty in simultaneously inputting two virtual keys when the user has to input each virtual key of the virtual keyboard image that is output in the virtual reality environment.

For example, when the user has to input each virtual key of the virtual keyboard image that is output in the virtual reality environment, the user may have difficulty in simultaneously inputting a "shift key" or a "control key" while inputting other virtual key.

In order to solve the above problem, multiple input values are assigned to each virtual key of the virtual keyboard image, and the keyboard input unit 130 provides a basic input value when a collision state flag is generated by the contact recognition unit 120, or provides another input value when an inner passing state flag is generated by the contact recognition unit 120 and an inner passing duration time is equal to or greater than a predetermined time.

For example, the keyboard input unit 130 outputs "a" that is a basic input value of a corresponding key when a flag type generated by the contact recognition unit 120 is a collision state flag of a specific virtual key, or outputs "A" that is another input value of the corresponding key when the flag type generated by the contact recognition unit 120 is an inner passing state flag and an inner passing duration time is equal to or greater than a predetermined time.

Accordingly, the present invention solves the conventional problem of simultaneously inputting two virtual keys by providing another input value of a virtual key without inputting the "shift key" or the "control key" while the user inputs each virtual key of the virtual keyboard image that is output in the virtual reality environment.

The feedback output unit 140 outputs feedback when a basic input value or another input value of a virtual key is provided by the keyboard input unit 130.

In one embodiment, when the feedback output unit 140 outputs visual feedback, and a basic input value or another input value of a corresponding virtual key is output, the feedback output unit 140 may provide state information of the corresponding virtual key through a color change or an animation effect.

In another embodiment, when the feedback output unit 140 outputs auditory feedback, and a basic input value or another input value of a corresponding virtual key is output, the feedback output unit 140 may provide state information of the corresponding virtual key that the corresponding virtual key is being pressed by changing a virtual key input sound.

In another embodiment, when the feedback output unit 140 outputs tactile feedback, the feedback output unit 140 may provide state information of a corresponding virtual key that the corresponding virtual key is being pressed by adjusting a vibration strength of a device being worn by the user.

As described above, the present invention may minimize an error rate of virtual key input by providing visual feedback, auditory feedback, and tactile feedback for a basic input value or another input value of a corresponding virtual key.

FIGS. 2A to 2D are reference views showing a rotation process of the virtual keyboard image executed in the apparatus for outputting the virtual keyboard according to the embodiment of the present invention.

Referring to FIGS. 2A to 2D, the apparatus for outputting the virtual keyboard 100 enables the user to use the virtual keyboard by outputting a virtual keyboard image 210 in the virtual reality environment.

For this, the apparatus for outputting the virtual keyboard 100 uses hand information received from the sensor, the sensor sensing the hand information is implemented by using the detection sensor or the body/hand motion capture device that is provided in the front surface of the head mount display device. The sensor provides coordinate information of the user's finger to the virtual keyboard image output unit 110.

The virtual keyboard image output unit 110 initially fixes a virtual keyboard image 210 at a position shown in FIG. 2A in an initial state, and rotates and outputs the virtual keyboard image 210 to be parallel to a user's palm 220 when the user intends to use the virtual keyboard. For this, the virtual keyboard image output unit 110 determines whether or not the user intends to use the virtual keyboard by using a distance 230 between a center point of the user's palm 220 and a center point of the virtual keyboard image 210.

In one embodiment, the virtual keyboard image output unit 110 determines that the user does not intend to use the virtual keyboard and does not perform any action when the distance 230 between the center point of the user's palm 220 and the center point of the virtual keyboard image 210 is equal to or greater than a predetermined distance as shown in FIG. 2A.

In another embodiment, the virtual keyboard image output unit 110 determines that the user intends to use the virtual keyboard, and rotates and outputs the virtual keyboard image 210 to be parallel to the user's palm 220 as shown in FIG. 2D when the distance 230 between the center point of the user's palm 220 and the center point of the virtual keyboard image 210 is equal to or less than the predetermined distance as shown in FIGS. 2B and 2C.

In the above embodiment, the virtual keyboard image output unit 110 detects a direction of a user's hand by using a normal vector of the user's palm 220 to output the virtual keyboard image 210 to be parallel to the user's palm 220.

FIGS. 3A to 3C are reference views showing an outputting process of the virtual keyboard image executed in the apparatus for outputting the virtual keyboard according to the embodiment of the present invention Referring to FIGS. 3A to 3C, the apparatus for outputting the virtual keyboard 100 outputs a virtual keyboard image 210 to be below a user's hand 220 when the virtual keyboard image 210 and the user's hand 220 overlap with each other, while the apparatus for outputting the virtual keyboard 100 outputs the virtual keyboard image 210 in the virtual reality environment.

For this, the virtual keyboard image output unit 110 respectively renders the virtual keyboard image 210 and a user's hand image 220 as shown in FIG. 3A, and outputs a final image by performing an image overlapping process as shown in FIG. 3C.

In one embodiment, the virtual keyboard image output unit 110 primarily compares rendering positions of the virtual keyboard image 210 and the user's hand image 220, and outputs the virtual keyboard image 210 except for an overlapped part as shown in FIG. 3B.

In another embodiment, the virtual keyboard image output unit 110 may erase the virtual keyboard image 210 and output the user's hand image 220 by performing an occlusion rendering process on a part in which the virtual keyboard image 210 and the user's hand image 220 overlap as shown in FIG. 3C, thereby, a user's hand 220 may always be output above the virtual keyboard image 210.

In the present invention, the reference numeral 220 is used to mean the user's hand, the user's palm, and the user's hand image.

Figure 4:
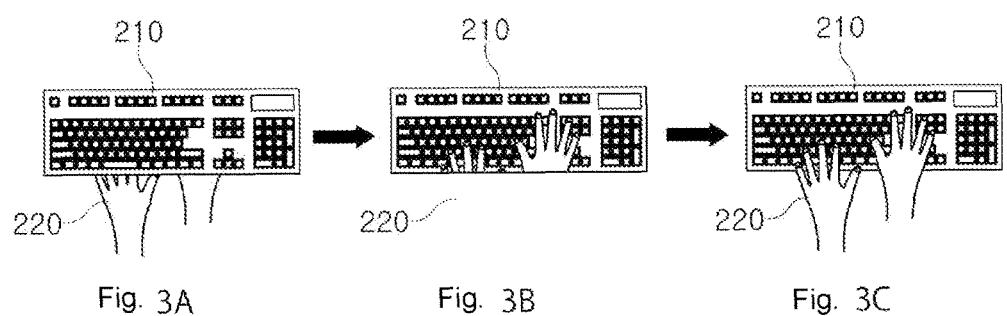
FIGS. 4A and 4B are reference views showing a contact recognition process by using a virtual physical collider executed in the apparatus for outputting the virtual keyboard according to the embodiment of the present invention.
Figure 4A:
Figure 4B:

FIGS. 4A and 4B are reference views showing a contact recognition process by using the virtual physical collider executed in the apparatus for outputting the virtual keyboard according to the embodiment of the present invention.

Referring to FIGS. 4A and 4B, the apparatus for outputting the virtual keyboard 100 recognizes a contact by determining whether or not virtual physical colliders respectively associated with the end point of the user's finger and with each virtual key of the virtual keyboard image collide with each other. The virtual physical collider associated with the end point of the user's finger may be implemented in a sphere form, and the virtual physical collider associated with each virtual key of the virtual keyboard image may be implemented in a specific form (for example, cube, etc.).

Conventionally, whether or not a specific virtual key is input is checked by checking whether or not tracking coordinates of a finger's end point received from a hand motion sensor are within a boundary area of one virtual key among virtual keys of a virtual keyboard image. However, in the conventional method, since there is no physical contact in a three dimensional space, there is recognition limit of a virtual key input by using only spatial depth information provided to a user. Thus, key input errors frequently occur.

For example, as shown in FIG. 4A, although the user has input a specific virtual key of the virtual keyboard image, a key input of the specific virtual key may not be determined as a contact, and the key input thereof may not be performed when coordinates of a finger's end point of the user are not placed within a boundary area of the specific key of a system.

However, as shown in FIG. 4B, the present invention respectively applies different virtual physical colliders to each virtual key of the virtual keyboard image and determines that an end part of the user's finger has contacted a specific virtual key of the virtual keyboard image when the virtual physical collider of the end point of the user's finger collides with the virtual physical collider associated with the specific virtual key, thus the conventional problem may not occur.

Figures 5A, 5B:
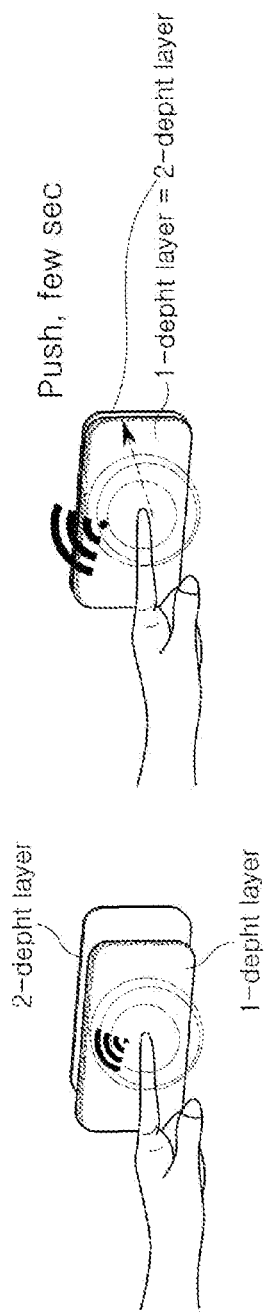
FIGS. 5A and 5B are reference views showing a character input process according to a flag type executed in the apparatus for outputting the virtual keyboard according to the embodiment of the present invention.

FIGS. 5A and 5B are reference views showing a character input process according to a flag type executed in the apparatus for outputting the virtual keyboard according to the embodiment of the present invention.

Referring to FIGS. 5A and 5B, the user may have difficulty in inputting two virtual keys at the same time when the user has to input each virtual key of the virtual keyboard image that is output in the virtual reality environment.

In order to solve the above problem, the apparatus for outputting the virtual keyboard 100 assigns multiple input values to each virtual key of the virtual keyboard image, and a basic input value of a specific virtual key is output when an end point of the user's finger collides with the virtual physical collider associated with the specific virtual key of the virtual keyboard image, or another input value of the specific virtual key is output when the user's finger passes the virtual physical collider of the specific virtual key and an inner passing duration time is equal to or greater than a predetermined time.

For example, the apparatus for outputting the virtual keyboard 100 outputs a basic input value "a" of a specific virtual key when an end point of the user's finger collides with a virtual physical collider associated with the specific virtual key among the virtual keys of the virtual keyboard image as shown in FIG. 5A.

In another embodiment, the apparatus for outputting the virtual keyboard 100 outputs another input value "A" of the specific virtual key when the end point of the user's finger passes the virtual physical collider associated with the specific virtual key among the virtual keys of the virtual keyboard image and an inner passing duration time is equal to or greater than the predetermined time as shown in FIG. 5B.

Accordingly, the present invention solves the conventional problem in which the user has difficulty in simultaneously inputting two virtual keys by providing another input value of the virtual key without inputting the "shift key" or the "control key" when the user has to input each virtual key of the virtual keyboard image that is output in the virtual reality environment.

Figure 6:
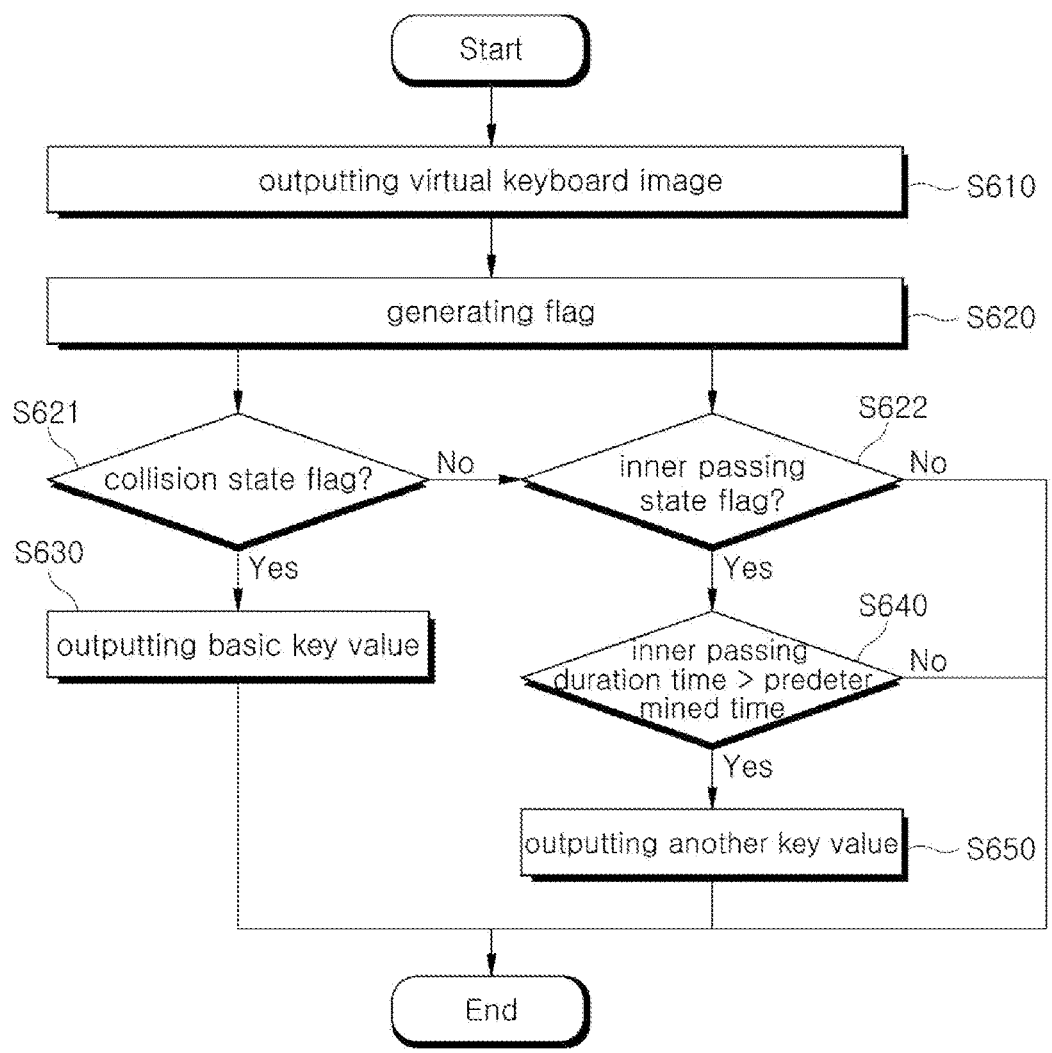
FIG. 6 is a flowchart showing a method of controlling the apparatus for outputting the virtual keyboard according to the embodiment of the present invention.

FIG. 6 is a flowchart showing a method of controlling the apparatus for outputting the virtual keyboard according to the embodiment of the present invention.

Referring to FIG. 6, in step S610, the apparatus for outputting the virtual keyboard 100 determines a position at which the virtual keyboard image will be output by using hand information received from the sensor and outputs the virtual keyboard image in the determined position.

In step S620, the apparatus for outputting the virtual keyboard 100 generates a flag according to collision information between virtual physical colliders respectively associated with an end part of a user's finger and with each virtual key of the virtual keyboard image.

When a flag type is a collision state flag of a specific virtual key in step S621, the apparatus for outputting the virtual keyboard 100 outputs a key value of the specific virtual key and feedback thereof in step S630. When the flag type is an inner passing state of the specific virtual key in step S622, the apparatus for outputting the virtual keyboard 100 checks whether or not an inner passing duration time is equal to or greater than a predetermined time in step S640.

When the inner passing duration time is equal to or greater than the predetermined time, the apparatus for outputting the virtual keyboard 100 outputs another key value of the specific virtual key and feedback thereof in step S650.

Although the present invention has been described with reference to the exemplary embodiments and the accompanying drawings, it is not limited to the above-mentioned exemplary embodiments but may be variously modified and changed from the above description by those skilled in the art to which the present invention pertains. Therefore, the scope and spirit of the present invention should be understood only by the following claims, and all of the equivalences and equivalent modifications to the claims are intended to fall within the scope and spirit of the present invention.

What is claimed is:

1. Apparatus for outputting a virtual keyboard, the apparatus comprising:

a virtual keyboard image output unit determining coordinates of a virtual keyboard image by using hand information of a user received from a sensor and outputting the virtual keyboard image by performing an image processing process;

a contact recognition unit recognizing a contact state by using collision information between a virtual physical collider associated with an end point of a user's finger and a virtual physical collider associated with each virtual key of the virtual keyboard image output from the virtual keyboard image output unit;

a keyboard input unit providing multiple input values for a single virtual key according to contact recognition information generated by the contact recognition unit; and a feedback output unit outputting respective feedback for the multiple input values provided by the contact recognition unit and the keyboard input unit, wherein the virtual keyboard image output unit:

deduces a three-dimension positional relationship between the user and the virtual keyboard image by using user's finger information received from the sensor;

determines that a user intends to use a virtual keyboard within a system when a distance between a center point of a user's palm and a center point of the virtual keyboard image is equal to or less than a predetermined distance;

calculates a normal vector of the user's palm and rotates and outputs the virtual keyboard image by using the calculated normal vector to make the virtual keyboard image parallel to the user's palm; and when a user's hand image and the virtual keyboard image overlap, performs a depth rendering process on an occlusion to erase the virtual keyboard image according to a shape of a user's hand and to preferentially output the user's hand image, thereby the virtual keyboard image is always placed under the user's hand.

2. The apparatus of claim 1, wherein the contact recognition unit applies the virtual physical colliders to an end point of the user's hand and to each virtual key of the virtual keyboard image output from the virtual keyboard image output unit, respectively, and determines a virtual keyboard input state by representing the contact state between the user's hand image and the virtual keyboard image in a collision state flag, in an inner passing state flag, and in a separation state flag by using the virtual physical colliders.

3. The apparatus of claim 2, wherein when the virtual physical collider of the end point of the user's hand collides with the virtual physical collider of the virtual key, the contact recognition unit calculates a finger position and a directional vector thereof at which the end point of the user's hand collides with the virtual physical collider, and generates the collision state flag only when the user's finger passes only a front surface of a physical model of the virtual physical collider of the virtual key.

4. The apparatus of claim 2, wherein the contact recognition unit calculates a key input interval for each virtual key in real time by using contact time of the virtual key of the virtual keyboard image, and when multiple key inputs are input within a predetermined time period for the same virtual key, the contact recognition unit does not generate the collision state flag.

5. The apparatus of claim 1, wherein the keyboard input unit provides a basic input value of a corresponding virtual key when the flag generated by the contact recognition unit is the collision state flag, or determines that the user has deeply input the virtual key and provides another input value of the corresponding virtual key that is preset when the flag generated by the contact recognition unit is the inner passing state flag and an inner passing duration time is maintained for a predetermined time period.

6. The apparatus of claim 1, wherein the feedback output unit respectively outputs different feedback for the multiple input values of the virtual key provided by the contact recognition unit and the keyboard input unit, and provides proper information for a virtual keyboard input by implementing a color change or an animation effect when the information is visual feedback, by implementing a virtual key input sound when the information is auditory feedback, and by adjusting a vibration strength of a device when the information is tactile feedback, the device including a vibrator, having a ring shape or a thimble shape, and being worn on an end part of the user's hand.

* * * * *